(12) United States Patent
Jee et al.

(10) Patent No.: US 8,730,908 B2
(45) Date of Patent: May 20, 2014

(54) METHOD OF SELECTING TARGET NETWORK FOR HAND-OVER AND METHOD THEREOF

(75) Inventors: Junghoon Jee, Daejeon (KR); Heeyoung Jung, Daejeon (KR); Hyeong-Ho Lee, Daejeon (KR); Eunah Kim, Daejeon (KR); Hong-Seok Jeon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 669 days.

(21) Appl. No.: 12/437,182

(22) Filed: May 7, 2009

(65) Prior Publication Data

US 2009/0219894 A1 Sep. 3, 2009

Related U.S. Application Data

(63) Continuation of application No. PCT/KR2007/000223, filed on Jan. 12, 2007.

(30) Foreign Application Priority Data

Nov. 7, 2006 (KR) .................. 10-2006-0109711
Jan. 10, 2007 (KR) .................. 10-2007-0003073

(51) Int. Cl.
*H04W 4/00* (2009.01)

(52) U.S. Cl.
USPC ......................................... 370/331; 370/332

(58) Field of Classification Search
USPC .......... 370/332, 331, 401, 329; 455/436, 437, 455/432
See application file for complete search history.

(56) References Cited

U.S. PATENT DOCUMENTS

| 7,356,013 | B2 * | 4/2008 | Linder et al. ................... 370/338 |
| 7,574,212 | B2 * | 8/2009 | McConnell et al. .......... 455/437 |
| 7,738,871 | B2 * | 6/2010 | Olvera-Hernandez et al. ............................. 455/436 |
| 7,813,319 | B2 * | 10/2010 | Dutta et al. .................... 370/331 |
| 2004/0057443 | A1 * | 3/2004 | Kim et al. ....................... 370/401 |
| 2005/0090257 | A1 | 4/2005 | Kroner et al. |
| 2005/0249161 | A1 | 11/2005 | Carlton |
| 2005/0272403 | A1 * | 12/2005 | Ryu et al. ....................... 455/403 |
| 2006/0025169 | A1 | 2/2006 | Maciocco et al. |

(Continued)

FOREIGN PATENT DOCUMENTS

| KR | 10-2005-0036521 | 4/2005 |
| KR | 10-2005-0059519 | 6/2005 |
| KR | 10-2006-0046384 | 5/2006 |

OTHER PUBLICATIONS

IEEE 802.21 Working Group "Handover Commands Update: LB Issue- #18: Comment 495" Vivek Gupta et al. Sep. 2006.*

(Continued)

*Primary Examiner* — John Blanton
(74) *Attorney, Agent, or Firm* — Staas & Halsey LLP

(57) ABSTRACT

A conventional handover method is performed in units of base stations, so that there is a problem in that a large amount of power for handover is consumed and implementation cost is high.
Through dedicated protocol message exchanges between a user equipment and a network or between networks, resource availability of candidate networks is checked in advance, a handover target network is selected from among the candidate networks according to a result of checking, and the selected target network is designated as a network to which the user equipment is handed over.

20 Claims, 9 Drawing Sheets

(56) References Cited

U.S. PATENT DOCUMENTS

| | | | |
|---|---|---|---|
| 2006/0099948 A1* | 5/2006 | Hoghooghi et al. | 455/436 |
| 2006/0172738 A1* | 8/2006 | Kwon et al. | 455/439 |
| 2006/0227746 A1* | 10/2006 | Kim et al. | 370/331 |
| 2006/0240832 A1* | 10/2006 | Kim et al. | 455/438 |
| 2007/0086359 A1* | 4/2007 | Yaqub | 370/254 |
| 2008/0019293 A1* | 1/2008 | Chang et al. | 370/310 |
| 2008/0051086 A2* | 2/2008 | Etemad et al. | 455/436 |

OTHER PUBLICATIONS

"Amendment of the MIH Handover Procedure: LB Issue # 18: Comment 495, 915," IEEE 802.21, Media Independent Handover Services Project, Jul. 13, 2006.

* cited by examiner

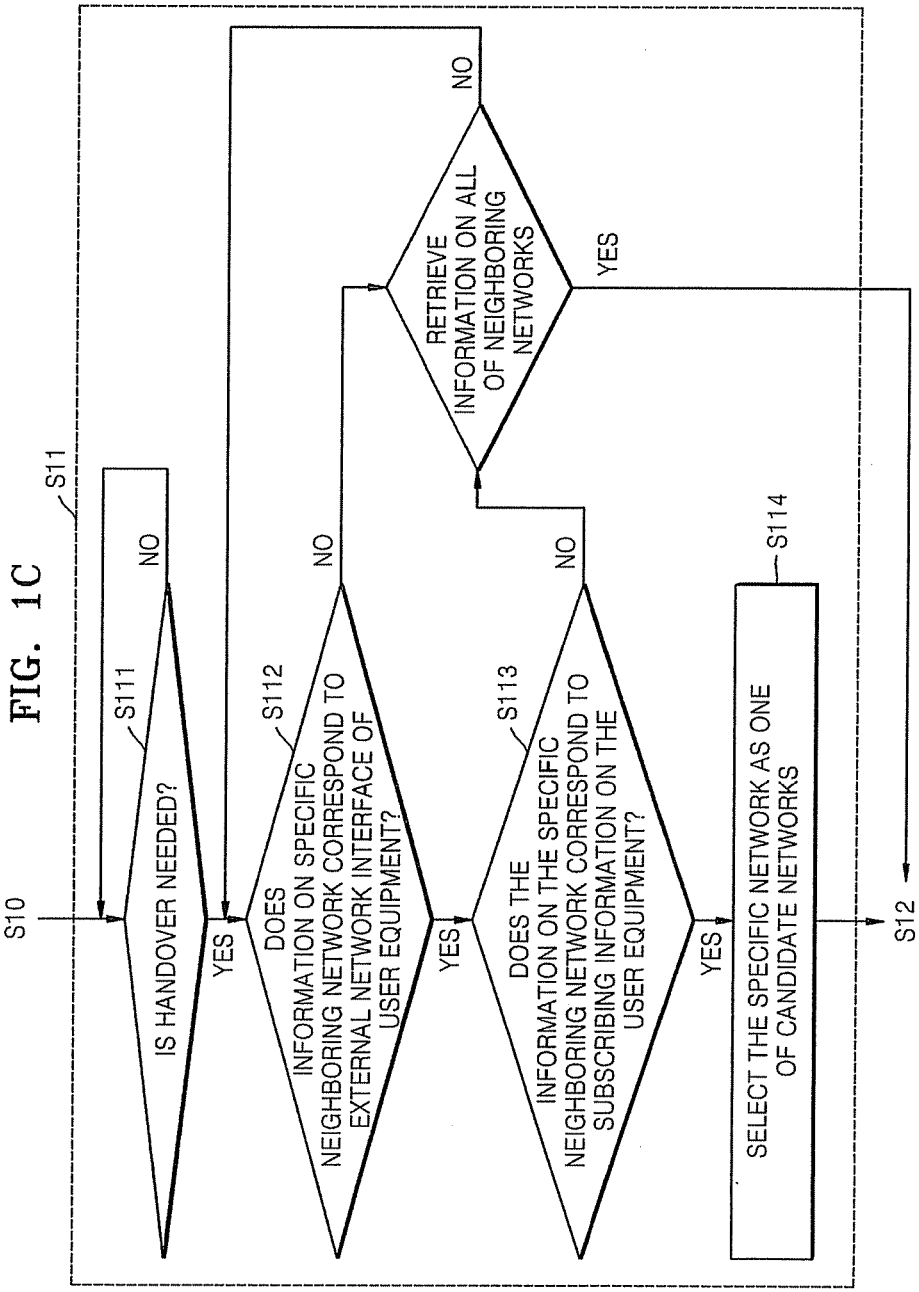

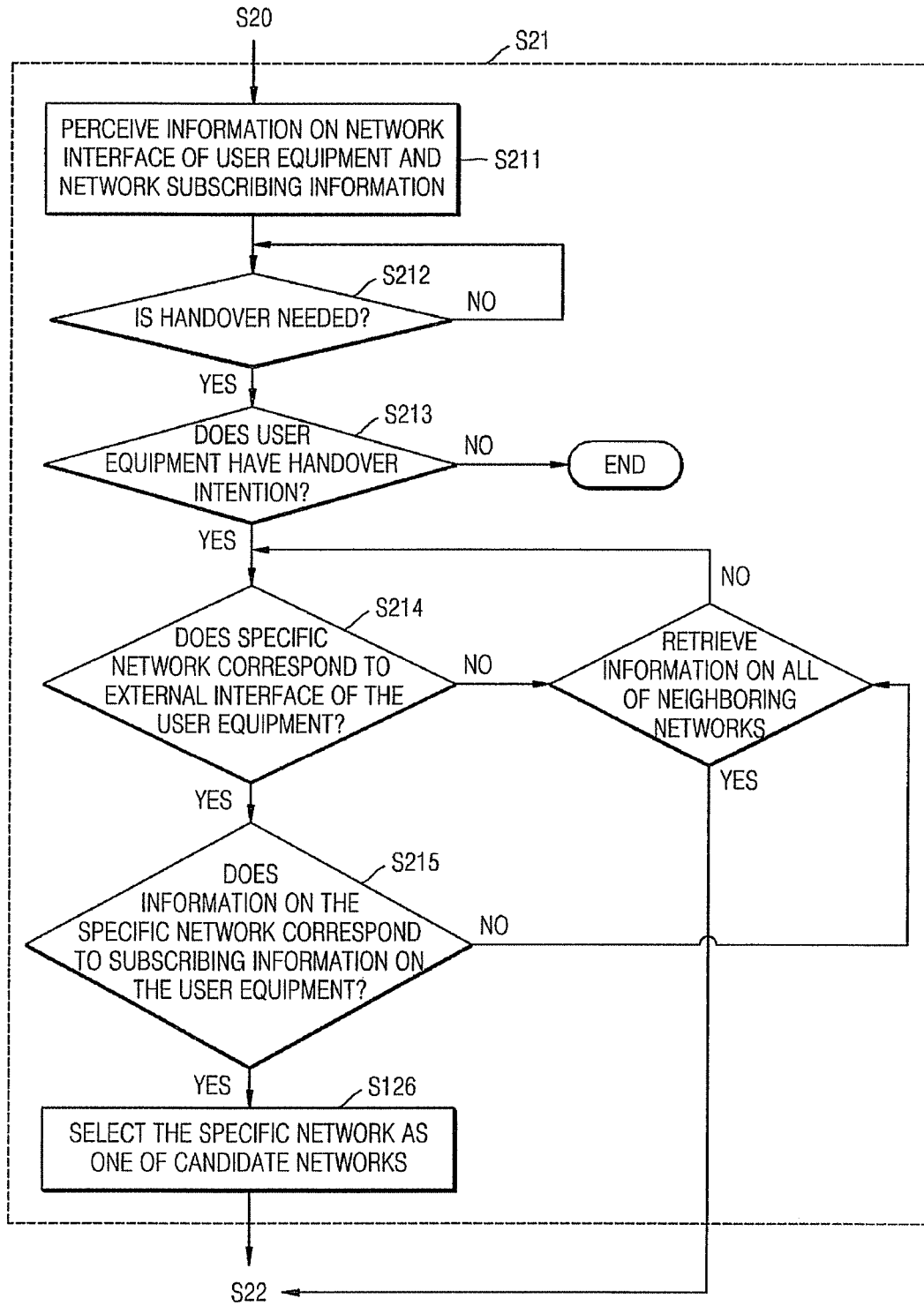

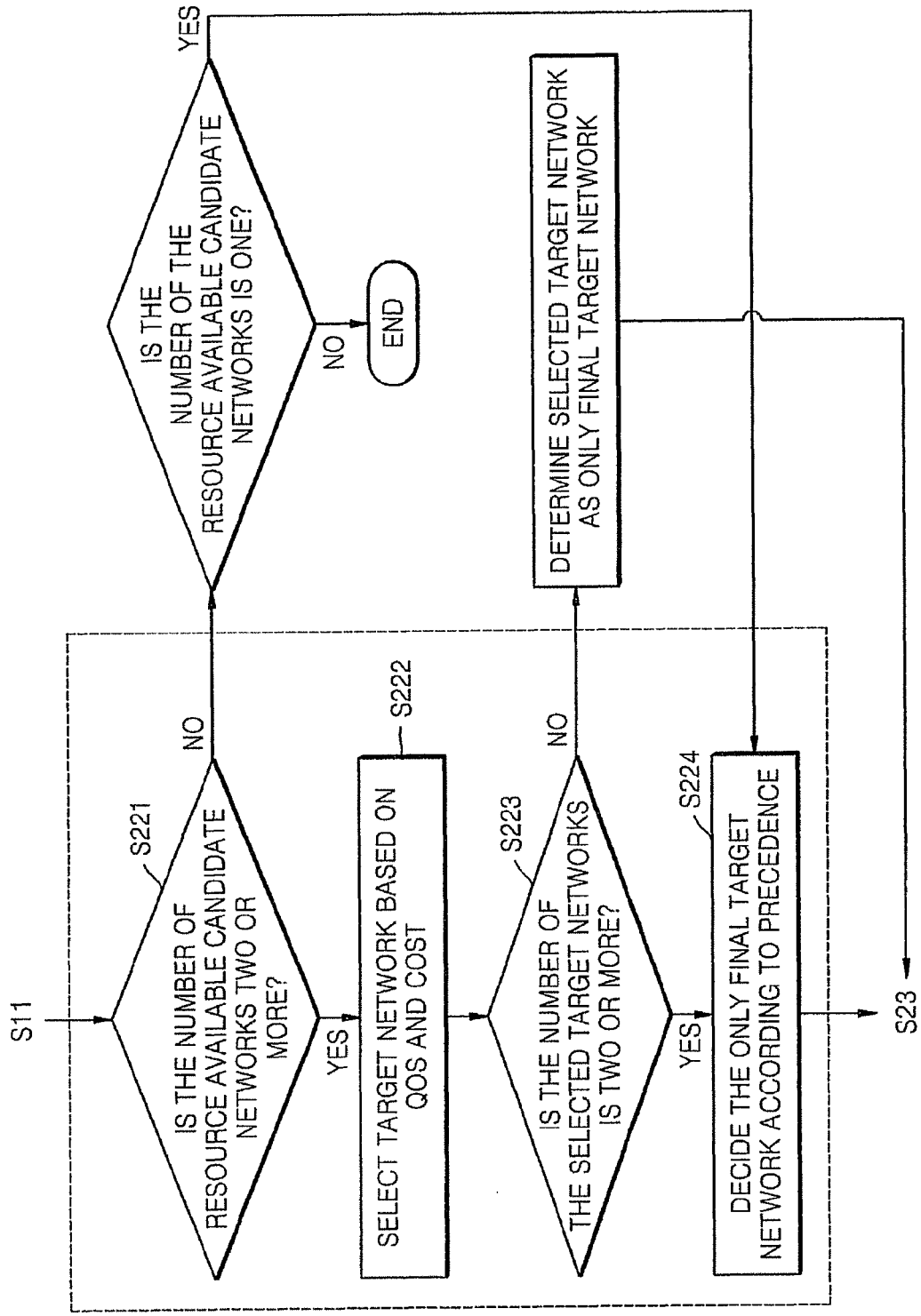

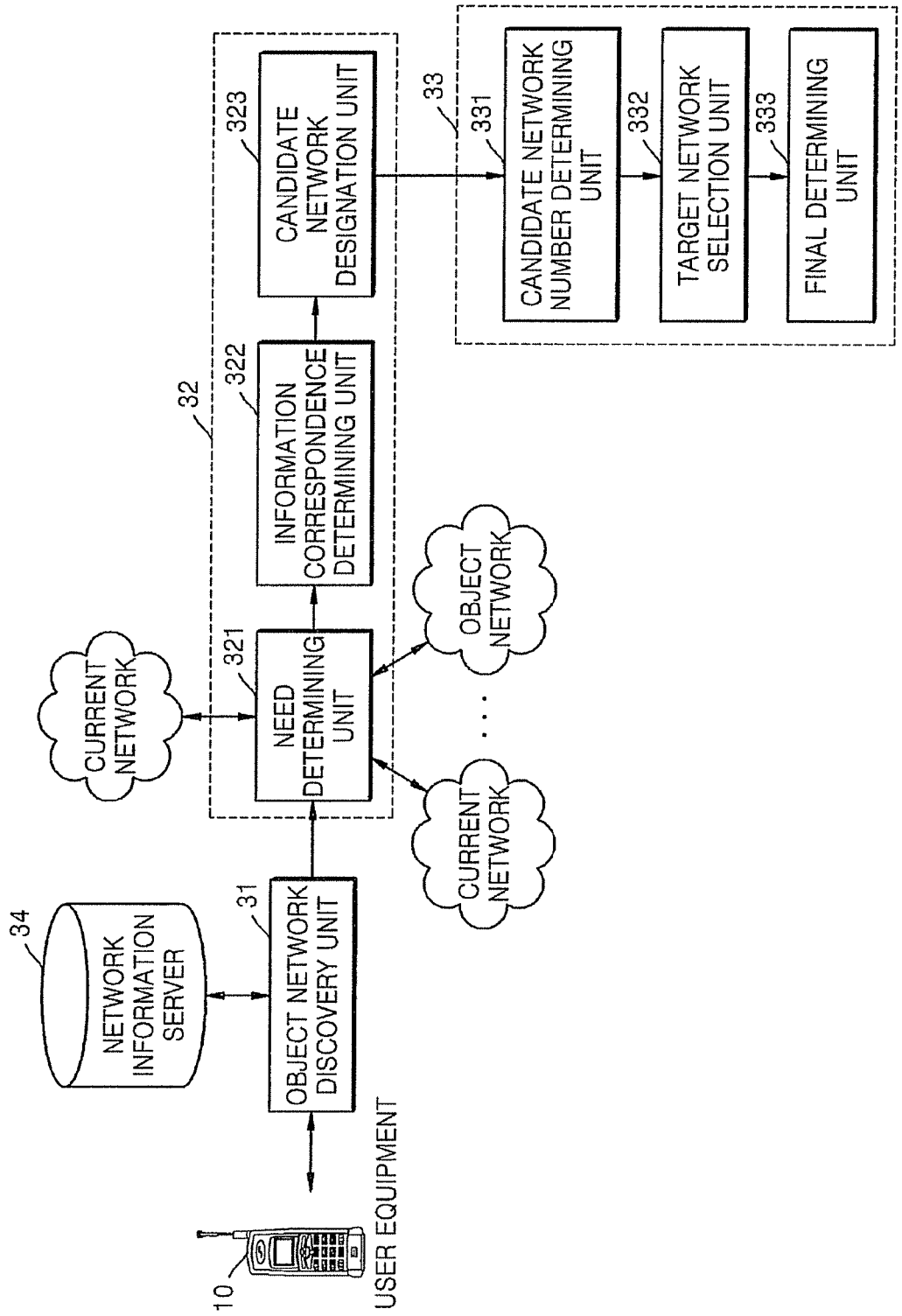

METHOD OF SELECTING TARGET NETWORK FOR HAND-OVER AND METHOD THEREOF

CROSS REFERENCE TO RELATED APPLICATIONS

This application is a continuation of and claims the benefit of International Application No. PCT/KR2007/000223, filed Jan. 12, 2007, and claims the benefit of Korean Application No. 10-2006-0109711, filed Nov. 7, 2006, and Korean Application No. 10-2007-0003073, filed Jan. 10, 2007, the disclosures of all of which are incorporated herein by reference.

TECHNICAL FIELD

The present invention relates to a method and system for selecting a handover target network, and more particularly, to a method and system for selecting from among a plurality of networks a network to which handover of a user equipment having multiple external network interfaces is optimal by checking availability of resources of the plurality of networks which can be selected by the user equipment.

BACKGROUND ART

A method of implementing media irrelevant to handover (U.S. Patent Publication No. 20050249161) is related to the present invention. An object of this method is to implement handover optimization between wireless local area networks (LANs) or a wireless LAN and a global system for mobile communication (GSM) network. This method performs the handover on the basis of status information and link information on networks measured by a system through a handover policy function (HPF) and has an advantage of optimizing the handover between the wireless LANs or the wireless LAN and the GSM network.

A method of selecting a network in a wireless terminal is disclosed in U.S. Patent Publication No. 20060025169. An object of this method is to provide a wireless terminal for reducing power consumption of a wireless terminal by using a wireless network selection algorithm. This method has an advantage of reducing the power consumption of the wireless terminal by selecting a network on the basis of power requirements defined in a system and a user profile.

DETAILED DESCRIPTION OF THE INVENTION

Technical Problem

The present invention provides a method and system used by a user equipment for selecting a handover target network capable of selecting handover candidate networks through predetermined protocol message exchanges, selecting a handover target network from among the candidate networks on a predetermined basis, and optimizing handover of the user equipment to the target network.

Technical Solution

Through dedicated protocol message exchanges between a user equipment and a network or between networks, resource availability of candidate networks is checked in advance, a handover target network is selected from among the candidate networks according to the result of the checking, and the selected target network is designated as a network to which the user equipment is handed over.

ADVANTAGEOUS EFFECTS

According to the present invention, in order to execute a handover, availability of resources of all of neighboring candidate networks neighboring a current network to which a user equipment is currently connected is checked. Thus, it is possible to precisely select an optimal target network in a heterogeneous handover circumstance.

DESCRIPTION OF THE DRAWINGS

FIG. 1C is a view showing detailed operations in a handover candidate network selection phase from among operations shown in FIG. 1A.

FIG. 2C is a view showing detailed operations in a handover candidate network selection phase from among operations shown in FIG. 2A.

FIG. 2D is a view showing detailed operations in a handover target network decision phase from among operations shown in FIG. 2A.

FIG. 3 is a view showing a system according to an embodiment of the present invention.

BEST MODE

Figure 1A:
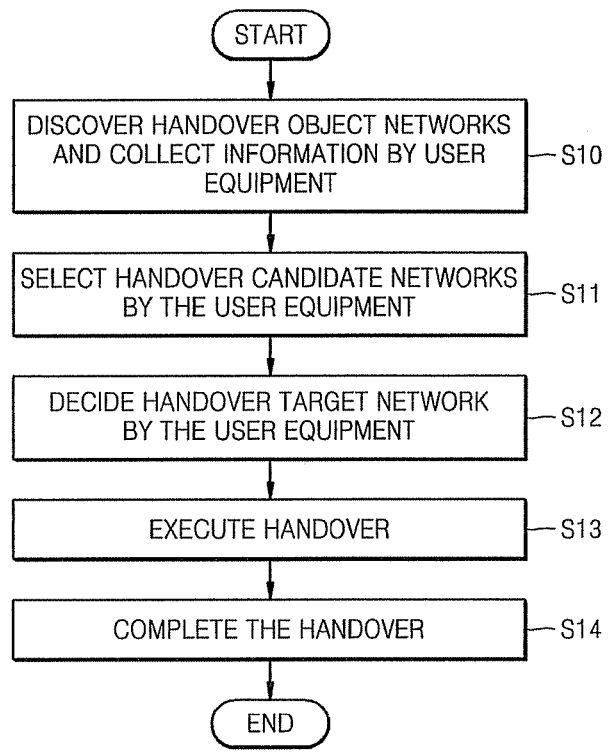
FIG. 1A is a view showing a target network selection mechanism according to an embodiment of the present invention.

According to an aspect of the present invention, there is provided a method of selecting a handover target network, comprising: (a) discovering handover object networks by a user equipment which wants to execute a handover; (b) selecting handover candidate networks from the discovered object networks by the user equipment; (c) deciding the only handover target network from among the selected candidate networks by the user equipment; and (d) executing the handover to the selected target network by the user equipment.

According to an another aspect of the present invention, there is provided a method of selecting a handover target network, comprising: (a) discovering handover object networks of a user equipment by a PoS (point of service) of a current network to which the user equipment which wants to execute a handover is currently connected; (b) selecting handover candidate networks from among the discovered object networks by the PoS; (c) deciding the only handover target network from among the selected candidate networks by the PoS; and (d) executing the handover of the user equipment to the decided target network by the PoS.

According to an aspect of the present invention, there is provided a system of selecting a handover target network, comprising: an object network discovery unit discovering handover object networks of a user equipment which wants to execute a handover; a candidate network selection unit selecting handover candidate networks from among the discovered object networks; and a target network decision unit deciding the only handover target network from among the selected candidate networks.

MODE FOR INVENTION

For the convenience of description, terms used in the present invention and the core technical solution of the present invention are firstly provided.

Terms used in the present invention are as follows.

A heterogeneous network environment means an environment including two or more networks having different characteristics. For example, a heterogeneous network is composed of a wireless local area network (LAN), a wireless broadband (Wibro), and a wireless code division multiple access (CDMA) network.

A current network means a network to which a user equipment is currently connected for network connection, that is, a network to which the user equipment is currently connected.

Neighboring networks mean networks neighboring the current network.

Candidate networks mean networks which can be selected as a next destination of the user equipment from among the neighboring networks, that is, networks to which the user equipment can be handed over.

A target network means the next destination of the user equipment from among the candidate networks, that is, a network which is selected as a handover target from among the candidate networks.

The core technical solution of the present invention is to check resource availability of candidate networks through protocol message exchanges between the user equipment and a network or between networks, select a handover target network from among the candidate networks according to the result of the checking, and determine the selected target network as a network to which the user equipment is handed over.

Hereinafter, exemplary embodiments of the present invention will be described in detail with reference to the attached drawings. Like reference numerals in the drawings denote like elements.

Figure 1B:
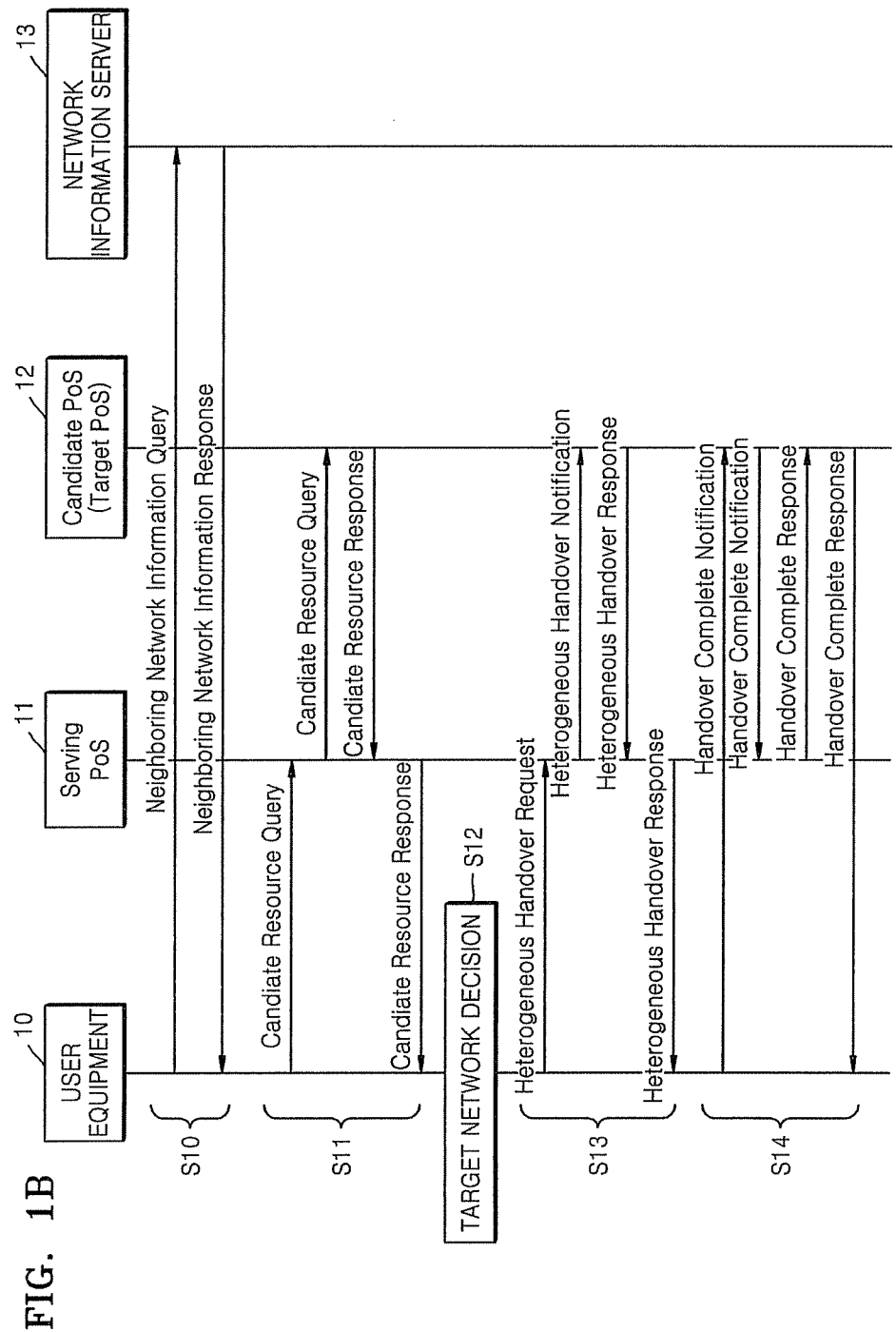
FIG. 1B is a view showing message exchanges between elements, which are used for target network selection and handover execution shown in FIG. 1A.
Figure 1D:
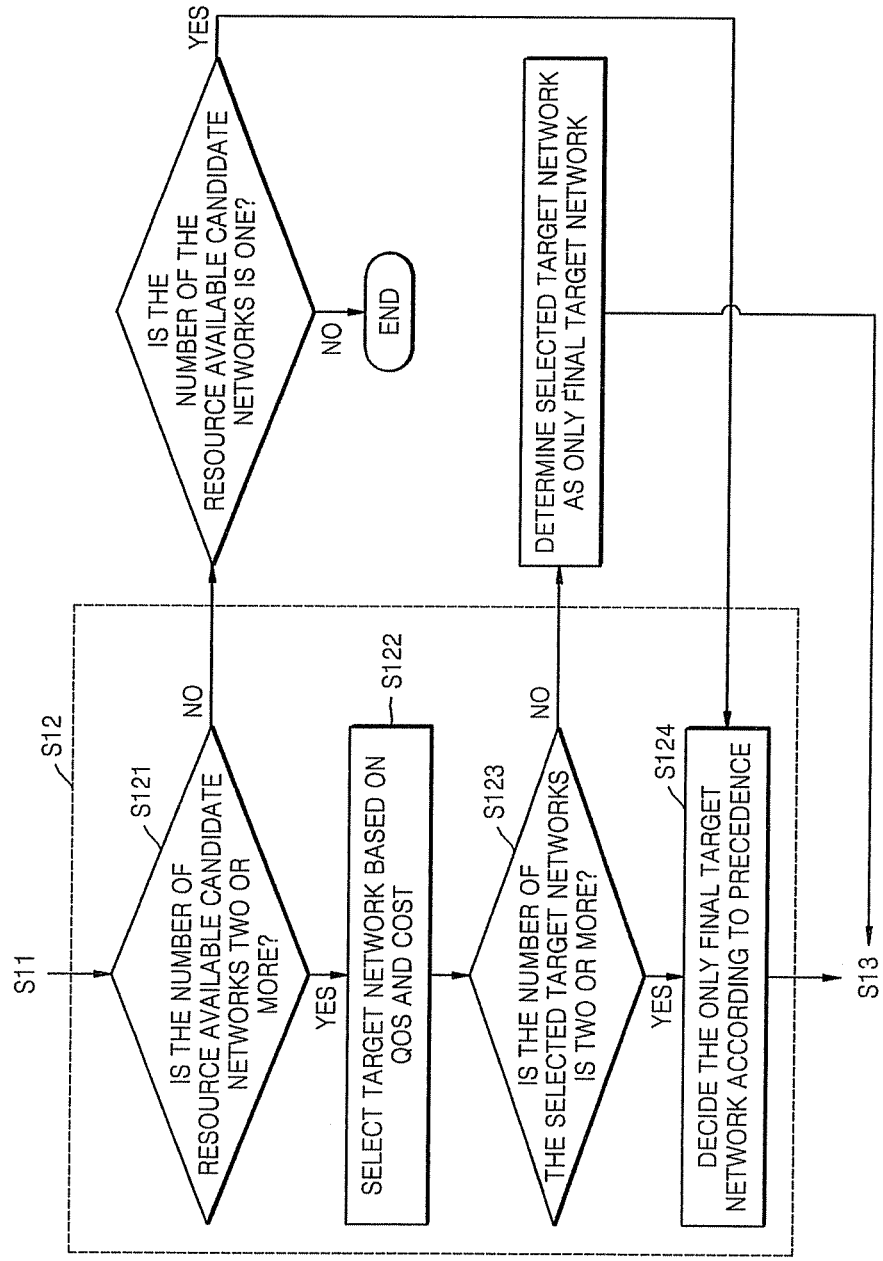
FIG. 1D is a view showing detailed operations in a handover target network decision phase from among operations shown in FIG. 1A.

FIGS. 1A to 1D are views showing a target network selection mechanism according to an embodiment of the present invention. FIG. 1A is a view showing the target network selection mechanism. FIG. 1B is a view showing message exchanges between elements, which are used for target network selection and handover execution. FIGS. 1C and 1D are views showing the mechanism shown in FIG. 1A in detail.

Referring to FIG. 1B, a system for selecting a handover target network by checking resource availability of candidate networks in a heterogeneous network environment according to an embodiment of the present invention includes a user equipment (UE) 10, a serving point of service (PoS) 11, candidate PoSs 12, a target PoS, and a network information server 13. The target PoS is one of the candidate PoSs 12. The UE 10 may be a mobile equipment or a fixed equipment which is movable between networks. The serving PoS 11 is a PoS of a current network to which the UE 10 is connected and supports the UE's selecting a handover target network in the heterogeneous network environment.

The candidate PoSs 12 are PoSs in candidate networks which have a possibility of being a handover target network of the UE 10. The target PoS is a PoS of a network selected as the target network of the UE 10 from among the candidate PoSs 12. Here, the PoSs may be implemented at a point of attachment (PoA) in a layer 2 where a wired or wireless connection function is performed or at an access router (AR) in a layer 3 where an Internet protocol (IP) connection function is performed. Otherwise, the PoSs may be disposed in a dedicated network device besides the PoA or the AR.

The network information server 13 is a server having various information on neighboring networks such as resources associated with the neighboring networks and provides the information on the neighboring networks to the UE 10 or the serving PoS 11 in order to support the UE's or the serving PoS's selecting a handover target network.

On the basis of the construction of the system, the target network selection by the mechanism shown in FIG. 1A is performed as follows.

A network discovery phase (operation S10) for discovering handover object networks from among the neighboring networks is performed by the UE 10 which wants to execute the handover. More specifically, in operation S10, the UE 10 transmits a neighboring network information query message to the network information server 13 in order to request handover object network information, and the network information server 13 then transmits a handover object network information response message to the UE 10 in response to the request in order to transmit the handover object network information. Here, the neighboring network information acquired by the UE 10 from the network information server 13 includes a network type with respect to each of the neighboring networks (for example, IEEE 802.11, IEEE 802.16, CDMA, universal mobile telecommunication system (UMTS), or the like), a network connection device address (for example, a media access control (MAC) address and an IP address of the PoA or the AR), a network service provider, or the like.

After the network discovery phase (operation S10), a handover candidate network selection phase (operation S11) is performed.

The UE 10 which acquires the handover object network information from the network information server 13 in the network discovery phase (operation S10) checks whether the handover is needed. In order to check whether the handover is needed, the UE 10 monitors in real-time quality and signal strength of the currently connected network and quality and signal strength of the heterogeneous network to which the UE 10 can be handed over (i.e., be connected). In this case, when the measurements of the monitored current network decrease to less than critical values, or the measurements of the heterogeneous network increase to more than critical values, the UE 10 determines that a handover is needed When the UE 10 determines that a handover is needed, the UE 10 transmits a candidate resource query message to the serving PoS 11 in order to request the serving PoS 11 to check resource availability of the candidate networks for the handover of the UE 10. Here, the UE 10 requests the serving PoS 11 to check the resource availability of only the candidate networks to which the UE 10 can be handed over from among the neighboring networks. The candidate networks are selected on the basis of the network types to which the UE 10 can be handed over and service subscribing information in the information on all of the neighboring networks acquired from the network information server 13 in the network discovery phase (operation S10).

The serving PoS 11 is requested to check the resource availability of the candidate networks from the UE 10, and transmits candidate resource query messages to the candidate PoSs 12 disposed in the corresponding candidate networks to query the availability of the resources that can support the UE 10.

Each of the candidate PoSs 12 checks the availability of the resources that can support the handover of the UE 10 in its network, and transmits a candidate resource response message to the serving PoS 11 to respond to the query. The serving PoS 11 then collates responses from the candidate PoSs 12 of the candidate networks and transmits a candidate resource response message to the UE 10. In this manner, the candidate network selection phase (operation S11) is performed.

After the candidate network selection phase (S11), a handover target network decision phase (operation S12) is performed.

The UE 10 decides a target network on the basis of the resource availability of the candidate networks acquired from the serving PoS 11 in the candidate network selection phase (operation S11). Here, as a specific basis of the target network decision, the target network may be automatically selected on a decision basis set in advance in the UE 10 (for example, quality of service (QoS) and cost etc.), or the target network may be decided by an input of a user of the UE 10 by querying the user.

Namely, when the number of the resource available candidate networks is two or more, the only final target network is automatically decided in consideration of the decision basis including the QoS and the cost. When a final target network decided on the basis of the QoS and the cost respectively is different from the decided final target network, a final target network is decided according to decision precedence. Here, the decision precedence is set in advance by the user or a manager. Otherwise, The user may be informed of an information on one or more candidate networks through a user interface in order to decide the final target network by a decision input of the user.

When the handover target network is decided in the target network decision phase (operation S12), a handover execution phase (operation S13) for handovering the UE 10 to the target network is performed.

After the UE 10 decides the final target network in the target network decision phase (operation S12), the UE 10 attempts to handover (connect) to the corresponding target network. The UE 10 transmits a heterogeneous handover request message to the serving PoS 11 to request the serving PoS 11 to execute the handover to the decided target network.

The serving PoS 11 which is requested to execute the handover transmits a heterogeneous handover notification message to a target PoS in the decided target network from among the candidate PoSs 12 to notify the handover request of the UE 10. The target PoS informs the serving PoS 11 of a response to the handover by transmitting a heterogeneous handover response message to the serving PoS 11, and the serving PoS 11 informs the UE 10 of the message. In this manner, the handover of the UE 10 is executed.

After the handover execution phase (operation S13) for handovering the UE 10 to the target network, a handover completing phase (operation S14) is performed. The handover completing phase is performed by complete message exchanges between the UE 10 and the target PoS and between the serving PoS 11 and the target PoS.

More specifically, after the handover of the UE 10 is completed, the UE 10 notifies the target PoS of the handover completion by transmitting a handover complete notification message to the target PoS. The target PoS notifies the serving PoS 11 which is in the network before the handover of the UE 10 of the handover completion by transmitting a handover complete notification message to the serving PoS 11.

Here, when the target PoS can perceive the handover completion without intervention of the UE 10, the target PoS can arbitrarily notify the serving PoS 11 of the handover completion. The serving PoS 11 responds to the handover completion by transmitting a handover complete response message to the target PoS, and the target PoS transmits the response to the handover completion notification by transmitting a handover complete response message to the UE 10.

FIG. 1C is a view showing detailed operations in the handover candidate network selection phase (operation S11) from among operations shown in FIG. 1A.

After the UE 10 discovers and collects information on all of the neighboring networks (the handover object network) neighboring the current network (operation S10), the UE 10 determines whether the handover is needed (operation S111) in a preceding operation of the candidate network selection phase (operation S11). A determining basis of the need is described above. When the need is determined, it is determined whether or not information on a specific neighboring network corresponds to an external network interface included in the UE 10 (operation S112). Namely, it is determined whether or not the UE 10 can be connected to the specific neighboring network.

When the determination result is negative, the determination (operation S112) is performed on another specific network. When the determination result is positive, it is determined whether or not information on the specific network corresponds to subscribing information on the UE 10 (operation S113). When the determination result is negative, the determinations (operations S112 and S113) are performed on another specific network. When the determination result is positive, the specific network is designated as one of the candidate networks (operation S114).

Namely, only when the specific network corresponds to the external network interface included in the UE 10 and the information on the specific network corresponds to the subscribing information on the UE 10, the specific network can be selected as the candidate network. Operations S112 to S114 are repeatedly performed on all of the individual neighboring network information. Here, the external network interface and the subscribing information above as the basis of the candidate network selection are only an example, and other basis may be used to perform the same operations.

FIG. 1D is a view showing detailed operations in the handover target network decision phase (operation S12) from among the operations shown in FIG. 1A.

It is determined whether or not the number of the resource available candidate networks, that is, the number of networks to which the UE 10 can be handed over, is two or more (operation S121). When the determination result is that the number is two or more, information on all of the resource available candidate networks is checked to select the handover target network on the basis of the QoS and service usage cost set in the UE 10 (operation S122).

When the determination result is that the number is not two or more, it means that there is no resource available candidate network or there is one resource available candidate network. When there is no resource available candidate network, the handover of the UE 10 does not occur, and when there is one resource available candidate network, the one resource available candidate network is determined as the only final target network (operation S124). Next, it is determined whether or not the number of selected target networks is two or more (operation S123). When the number is not two or more, it means that the selected target network is the only target network. Therefore, the selected target network is determined as the only final target network (operation S124). When the number of the selected target networks is determined to be two or more, the only final target network is decided according to precedence of the aforementioned basis values. More specifically, when the QoS has precedence over the cost, a network satisfying the basis of the QoS is decided as the only final destination network (operation S124). Here, the QoS and the cost described above as the basis of the target network decision are only an example, and other basis may be used to perform the same operations.

Figure 2A:
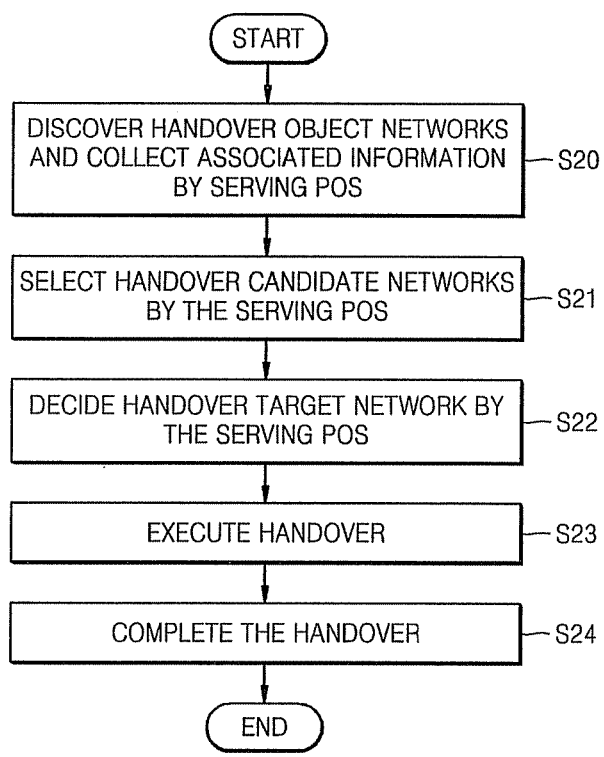
FIG. 2A is a view showing a target network selection mechanism according to another embodiment of the present invention.
Figure 2B:
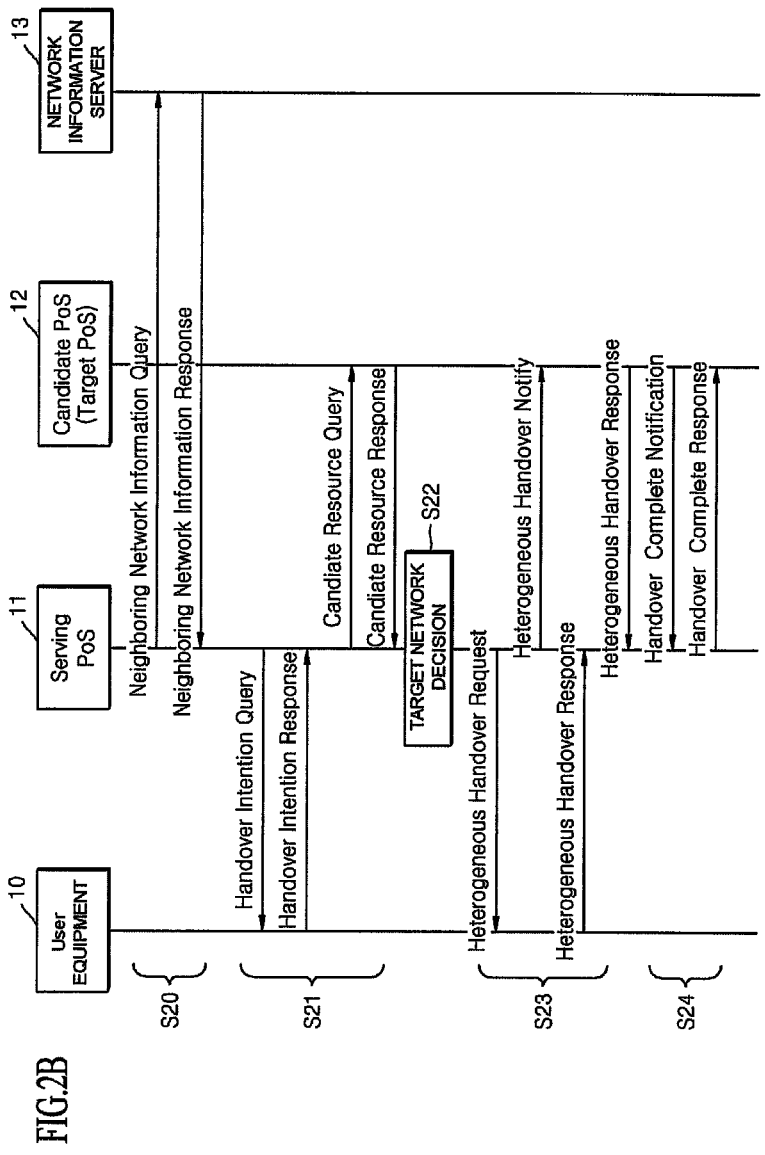
FIG. 2B is a view showing message exchanges between elements, which are used for target network selection and handover execution shown in FIG. 2A.

FIGS. 2A to 2D are views showing a target network selection mechanism according to another embodiment of the present invention. FIG. 2A is a view showing the target network selection mechanism. FIG. 2B is a view showing message exchanges between elements, which are used for target network selection and handover execution. FIGS. 2C and 2D are views showing the mechanism shown in FIG. 2A in detail.

The embodiment shown in FIGS. 2A to 2D is different from the embodiment shown in FIGS. 1A to 1D in that in the latter, the target network selection mechanism execution is led by the UE 10, however, in the former, the mechanism execution is led by the serving PoS 11.

A network discovery phase (operation S20) for discovering handover object networks from among neighboring networks is performed by the serving PoS 11 in the current network to which the UE 10 which wants to execute the handover is currently connected. More specifically, in operation S20, the serving PoS 11 transmits a neighboring network information query message to the network information server 13 in order to request handover object network (neighboring network) information, and the network information server 13 then transmits a neighboring network information response message to the serving PoS 11 in response to the request in order to transmit the neighboring network information.

Here, the neighboring network information acquired by the serving PoS 11 from the network information server 13 includes a network type with respect to each of the neighboring networks (for example, IEEE 802.11, IEEE 802.16, CDMA, UMTS, or the like), a network connection device address (for example, a MAC address and an IP address of the PoA and the AR), a network service provider, or the like.

After the network discovery phase (operation S20), a handover candidate network selection phase (operation S21) is performed.

The serving PoS 11 which acquires the neighboring network information from the network information server 13 in the network discovery phase (operation S20) checks whether the handover is needed. In order to check whether the handover is needed, the serving PoS 11 monitors in real time quality and signal strength of the current network to which the UE 10 is currently connected and quality and signal strength of the neighboring heterogeneous network to which the UE 10 can be handed over (i.e., be connected). In this case, when the measurements of the monitored current network decrease to less than critical values, or the measurements of the heterogeneous network increase to more than critical values, the serving PoS 11 determines that a handover is needed.

When the serving PoS 11 determines that a handover is needed, the serving PoS 11 transmits a handover intention query message to the UE 10 in order to query handover intention of the UE 10, network interface information included in the UE 10, and subscribing information on each of the networks. The UE 10 sets a possibility of the handover and heterogeneous network handover intention of the UE 10 in response to the query, and transmits a handover intention response message including the network interface information and the network subscribing information included in the UE 10 to the serving PoS 11.

The serving PoS 11 checks the heterogeneous network handover intention of the UE 10 from the handover intention response message. When the UE 10 has the heterogeneous network handover intention, information on candidate networks to which the UE 10 can be handed over is extracted from the information on all of the neighboring networks acquired from the network information server 13 on the basis of the network interface information and the network subscribing information included in the UE 10, in order to select the handover candidate networks.

For the selection, the serving PoS 11 transmits candidate resource query messages to candidate PoSs 12 disposed in the candidate networks to query availability of resources that can support the UE 10. Each of the candidate PoSs 12 checks the availability of the resources that can support the UE 10 in its network and transmits a candidate resource response message to the serving PoS 11 in response to the query of the serving PoS 11. The serving PoS 11 then collates responses from the candidate PoSs 12 of the candidate networks and selects candidate PoSs to which the UE 10 can be handed over. In this manner, the candidate network selection phase (operation S21) is performed.

After the candidate network selection phase (S21), a handover target network decision phase (operation S22) is performed.

The serving PoS 11 decides a handover target network on the basis of the information on the checked candidate PoSs. When the number of the selected resource available candidate networks is two or more, the only final target network is decided in consideration of service cost and QoS used for connection to a corresponding network. When the number of the final target networks selected on the basis of the QoS and service cost respectively is two or more, the only target network is decided according to a basis having precedence. The precedence is set in advance by a network manager.

When the handover target network is decided in the target network decision phase (operation S22), a handover execution phase (operation S23) for handovering the UE 10 to the target network is performed.

After the serving PoS 11 decides the only final target network, the serving PoS 11 transmits a heterogeneous handover request message to the UE 10 to request the UE 10 to execute the handover. Simultaneously, the serving PoS 11 transmits a heterogeneous handover notify message to the target PoS in order to notify the target PoS of the handover of the UE 10 to the target network.

The UE 10 transmits a heterogeneous handover response message to the serving PoS 11 to notify the serving PoS 11 of the connection (handover) to the final target network in response to the heterogeneous handover request message from the serving PoS 11. The target PoS transmits a heterogeneous handover response message to the serving PoS 11 to notify the serving PoS 11 of the connection of the UE 10 to the final target network in response to the heterogeneous handover notify message. In this manner, the handover execution phase (operation S23) is performed.

After the handover execution phase (operation S23) for handovering the UE 10 to the target network, a handover completing phase (operation S24) is performed. The handover completing phase is performed by complete message exchanges between the serving PoS 11 and the target PoS.

More specifically, after the handover of the UE 10 is completed, the target PoS notifies the serving PoS 11 of the handover completion by transmitting a handover compete notification message, and the serving PoS 11 transmits a handover complete response message to the target PoS as a response. In this manner, the handover completing phase is performed.

FIG. 2C is a view showing detailed operations in the handover candidate network selection phase (operation S21) from among operations shown in FIG. 2A.

After the serving PoS 11 discovers and collects information on all of the neighboring networks neighboring the current network (operation S20), the serving PoS 11 perceives an external network interface of the UE 10 and network subscribing information (operation S211). Next, the serving PoS 11 determines whether the handover is needed (operation S212) in a preceding operation of the candidate network selection phase (operation S21). The determining basis of the need is described above.

When the need is determined, it is determined whether or not UE 10 intends to handover (operation S213).

According to a result of determining, when the UE 10 has the handover intention, it is determined whether or not a specific neighboring network corresponds to the perceived external network interface (operation S214). Namely, it is determined whether or not the UE 10 can be connected to the specific neighboring network.

When the determination result is negative, the determination (operation S214) is performed on another specific network. When the determination result is positive, it is determined whether or not information on the specific network corresponds to the perceived subscribing information (operation S215). When the determination result is negative, the determinations (operation S214 and S215) are performed on another specific network. When the determination result is positive, the specific network is selected as one of the candidate networks (operation S216).

Namely, only when the specific network corresponds to the external network interface included in the UE 10 and the information on the specific network corresponds to the subscribing information on the UE 10, the specific network can be selected as the candidate network. Operations S214 to S216 are repeatedly performed on all of the individual neighboring network information. Here, the external network interface and the subscribing information above as the basis of the candidate network selection are only an example, and other basis may be used to perform the same operations.

FIG. 2D is a view showing detailed operations in the handover target network decision phase (operation S22) from among the operations shown in FIG. 2A.

It is determined whether or not the number of the resource available candidate networks, that is, the number of networks to which the UE 10 can be handed over, is two or more (operation S221). When the determination result is that the number is two or more, information on all of the resource available candidate networks is checked to select the handover target network on the basis of the QoS and service usage cost set in the UE 10 (operation S222).

When the determination result is that the number is not two or more, it means that there is no resource available candidate network or there is one resource available candidate network. When there is no resource available candidate network, the handover of the UE 10 does not occur, and when there is one resource available candidate network, the one resource available candidate network is determined as the only final target network (operation S224).

Next, it is determined whether or not the number of selected target networks is two or more (operation S223). When the number is not two or more, it means that the selected target network is the only target network. Therefore, the selected target network is determined as the only final target network (operation S224). When the number of the selected target networks is determined to be two or more, the only final target network is decided according to precedence of the aforementioned basis values. More specifically, when the QoS has precedence over the cost, a network satisfying the basis of the QoS is decided as the only final destination network (operation S224). Here, the QoS and the cost described above as the basis of the target network decision are only an example, and other basis may be used to perform the same operations.

FIG. 3 is a view showing a system according to an embodiment of the present invention.

The system according to the embodiment shown in FIG. 3 can be implemented by including the mechanisms shown in FIGS. 1A to 2D.

An object network discovery unit 31 is a unit for discovering handover object networks of the UE 10 which wants to execute handover from among neighboring networks. The object network discovery unit 31 requests object network information of the network information server 34 having the object network information, and the network information server 34 then transmits the object network information to the object network discovery unit 31 in response to the request so as to enable the object network discovery unit 31 to discover the object networks.

A candidate network selection unit 32 is a unit for selecting handover candidate networks from among the object networks discovered by the object network discovery unit 31. For the candidate network selection, firstly, a handover need determining unit 321 determines a need of handover of the UE 10. When the need is determined, an information correspondence determining unit 322 determines whether or not the object network information corresponds to information included in the UE 10.

Next, when the object network information corresponds to the information included in the UE 10, a candidate network designation unit 323 designates the corresponding object network as one of the candidate networks to select the candidate networks.

Here, the need determining unit 321 monitors in real time quality and signal strength of the current network to which the UE 10 is currently connected and quality and signal strength of the object networks. In this case, when the quality and the signal strength of the current network decrease to less than critical values, or the quality and the signal strength of the object networks increase to more than critical values, whether or not a handover is needed is determined.

The information correspondence determining unit 322 determines whether or not the object network corresponds to an external network interface included in the UE 10 and the object network information corresponds to subscribing information on the UE 10. A candidate network designation unit 323 designates the object network as the candidate network only when the object network corresponds to the external network interface of the UE 10 and the object network information corresponds to the subscribing information on the UE 10.

A target network decision unit 33 is a unit for deciding the handover target network from among the candidate networks selected by the candidate network selection unit 32 and decides the only final target network from among the selected candidate networks.

A candidate network number determining unit 331 determines whether or not the number of the candidate networks selected by the candidate network selection unit 32 is plural. When the determined number is plural, a target network selection unit 332 selects a target network from among the all of the candidate networks with reference to the information on all of the selected candidate networks and the decision basis of the target network set in the UE 10.

Here, the decision basis of the target network includes, as described above with reference to FIGS. 1A to 2D, the QoS and the service usage cost set in the UE 10.

When the number of the target networks selected by the target network selection unit 332 is two or more, a final decision unit 333 decides the only target network according to precedence of the decision basis. When it is determined that the number of the selected target networks is two or more, the only target network is decided according to precedence of the aforementioned two basis values. More specifically, when the QoS has precedence over the cost, a network satisfying the basis of the QoS is decided as the only final destination network. Here, the QoS and the cost described above as the basis of the target network decision are only example, and other basis may be used to perform the same operations.

When the number of the selected candidate networks is one, the target decision unit 33 decides the one candidate network as the only target network.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of supporting a handover of a terminal in a serving point of service (PoS), the method comprising:
   receiving a first query on resources of candidate networks from the terminal;
   transmitting second queries on the resources of the candidate networks to PoSs of the candidate networks;
   receiving responses to the second queries from the PoSs of the candidate networks;
   transmitting a response to the first query to the terminal;
   receiving a request for a handover commitment toward a target network from the terminal, the target network being selected from among the candidate networks; and
   notifying a handover of the terminal to a PoS of the target network,
   wherein information on neighboring networks including the candidate networks is obtained, at the terminal, by requesting the information to a network information server and receiving a response to the request for the information from the network information server.

2. The method of claim 1, wherein the target network is selected by the terminal based on the resources of the candidate networks.

3. The method of claim 1, further comprising:
   receiving a response to said handover notification from the PoS of the target network; and
   transmitting a response to the request for the handover commitment to the terminal.

4. The method of claim 3, further comprising exchanging information on handover completion with the PoS of the target network after the handover is completed.

5. The method of claim 4, wherein exchanging the information on the handover completion is performed after the terminal notifies the handover completion to the PoS of the target network.

6. A method of performing a handover in a terminal, the method comprising:
   requesting information on neighboring networks including candidate networks to a network information server;
   receiving a response to the request for the information from the network information server;
   transmitting a query on resources of the candidate networks to a serving point of service (PoS);
   receiving a response to the query from the serving PoS;
   transmitting a request for a handover commitment toward a target network to the serving PoS, the target network being selected from among the candidate networks;
   receiving a response to the request from the serving PoS;
   notifying a handover completion to a PoS of the target network; and
   receiving a response to said handover notification from the PoS of the target network.

7. The method of claim 6, further comprising selecting the target network based on the resources of the candidate networks.

8. The method of claim 6, wherein receiving the response to the query is performed after the serving PoS transmits a query on the resources of the candidate networks to PoSs of the candidate networks in accordance with the query from the terminal and then receives responses from the PoSs of the candidate networks.

9. The method of claim 6, wherein the serving PoS notifies a handover of the terminal to the PoS of the target network in accordance with the request for the handover commitment, and then receives a response to said handover notification from the PoS of the target network.

10. The method of claim 6, wherein the serving PoS exchanges information on the handover completion with the target network in accordance with said handover completion notification.

11. A method of supporting a handover of a terminal in a serving point of service (PoS), the method comprising:
    transmitting a handover intention query to the terminal;
    receiving a response to the handover intention query from the terminal;
    transmitting network information queries on resources of candidate networks to PoSs of the candidate networks, in accordance with the response to the handover intention query;
    receiving responses to the network information queries from the PoSs of the candidate networks;
    requesting a handover commitment toward a target network to the terminal, the target network being selected from among the candidate networks; and
    receiving a response to said request for the handover commitment from the terminal.

12. The method of claim 11, further comprising selecting the target network based on the resources of the candidate networks.

13. The method of claim 11, further comprising:
notifying a handover of the terminal to the PoS of the target network after receiving the responses to the network information queries; and
receiving a response to said handover notification from the PoS of the target network.

14. The method of claim 11, further comprising
exchanging information on the handover completion with the PoS of the target network after the handover is completed.

15. The method of claim 11, further comprising:
requesting information on neighboring networks including the candidate networks to a network information server; and
receiving a response to said request for the information from the network information server.

16. A method of performing a handover in a terminal, the method comprising:
receiving a query on a handover intent from a serving point of service (PoS);
transmitting a response to the query to the serving PoS;
receiving a request for a handover commitment toward target network from the serving PoS; and
transmitting a response to the request to the serving PoS,
wherein the target network is selected from among candidate networks after the serving PoS transmits queries on resources of the candidate networks to PoSs of the candidate networks and then receives responses to the queries.

17. The method of claim 16, wherein the target network is selected by the serving PoS based on the resources of the candidate networks.

18. The method of claim 16, wherein the serving PoS notifies a handover of the terminal to the PoS of the target network after receiving the response to the queries, and then receives a response to said handover notification from the PoS of the target network.

19. The method of claim 16, wherein the serving PoS exchanges information on a handover completion with the PoS of the target network after the handover is completed.

20. The method of claim 16, wherein the serving PoS requests information on neighboring networks including the candidate networks to a network information server, and then receives a response to said request for the information from the network information server.

\* \* \* \* \*